United States Patent
Brogan et al.

(10) Patent No.: US 12,027,868 B2
(45) Date of Patent: Jul. 2, 2024

(54) CONTROLLING A WIND TURBINE CONVERTER

(71) Applicant: Siemens Gamesa Renewable Energy A/S, Brande (DK)

(72) Inventors: Paul Brian Brogan, Glasgow (GB); Paul Godridge, Cheadle (GB); Joseph Hartley, Crewe (GB); Jiaming Liu, Zhejiang (CN); Syed Pirzada, London (GB); Anastasios Thanos, Glasgow (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 110 days.

(21) Appl. No.: 17/600,161

(22) PCT Filed: Mar. 27, 2020

(86) PCT No.: PCT/EP2020/058688
§ 371 (c)(1),
(2) Date: Sep. 30, 2021

(87) PCT Pub. No.: WO2020/207823
PCT Pub. Date: Oct. 15, 2020

(65) Prior Publication Data
US 2022/0158575 A1    May 19, 2022

(30) Foreign Application Priority Data
Apr. 12, 2019 (EP) .................................... 19168829

(51) Int. Cl.
*H02J 3/00* (2006.01)
*H02J 3/38* (2006.01)

(52) U.S. Cl.
CPC ........... *H02J 3/381* (2013.01); *H02J 2300/28* (2020.01)

(58) Field of Classification Search
CPC ........ H02P 9/48; H02P 2101/15; H02J 3/381; H02J 2300/28; F03D 7/028; Y02E 10/76; Y02E 10/72
See application file for complete search history.

(56) References Cited

U.S. PATENT DOCUMENTS

| | | | | |
|---|---|---|---|---|
| 5,083,039 A | * | 1/1992 | Richardson | ............. H02J 3/381 290/55 |
| 2007/0069522 A1 | * | 3/2007 | Barton | ...................... H02J 3/38 290/44 |

(Continued)

FOREIGN PATENT DOCUMENTS

| | | |
|---|---|---|
| EP | 3076542 A1 | 10/2016 |
| ES | 2189664 A1 | 7/2003 |
| WO | WO-2016184470 A1 * | 11/2016 |

OTHER PUBLICATIONS

European Search Report dated Nov. 5, 2019 for application No. 19168829.0.

(Continued)

*Primary Examiner* — Julio C. Gonzalez
(74) *Attorney, Agent, or Firm* — Schmeiser, Olsen & Watts LLP (57) ABSTRACT

Provided is a method of controlling a converter, in particular of a wind turbine, the converter including a first converter portion connected to a generator, a DC-link, and a second converter portion connected to a utility grid. The method including: controlling the first converter portion and the second converter portion by a first control signal and a second control signal, respectively, both being derived based on a requested power signal, in particular requested active power signal, and a generator rotational speed, wherein the first control signal indicates substantially constant generator (Continued)

torque for rotational speed variations of the generator rotational speed above a frequency threshold.

14 Claims, 3 Drawing Sheets

(56) References Cited

U.S. PATENT DOCUMENTS

2009/0206606 A1\* 8/2009 Jorgensen ............. F03D 7/0224
290/44
2011/0089693 A1 4/2011 Nasiri

OTHER PUBLICATIONS

International Search Report and the Written Opinion of the International Searching Authority dated Jul. 22, 2020 for application No. PCT/EP2020/058688.

\* cited by examiner

CONTROLLING A WIND TURBINE CONVERTER

CROSS-REFERENCE TO RELATED APPLICATIONS

This application claims priority to PCT Application No. PCT/EP2020/058688, having a filing date of Mar. 27, 2020, which is based off of EP Application No. 19168829.0, having a filing date of Apr. 12, 2019, the entire contents both of which are hereby incorporated by reference.

FIELD OF TECHNOLOGY

The following relates to a method and to an arrangement of controlling a converter having a generator converter portion and a utility grid converter portion. Further, the following relates to a generator system and further relates to a wind turbine.

BACKGROUND

Conventionally, between a generator of a wind turbine and an output terminal of the wind turbine, a converter is connected which converts the variable frequency AC power stream to a substantially fixed frequency AC power stream. The output terminal of the wind turbine is, potentially via a point of common connection, to which plural other wind turbines are connected, and via optionally one or more wind park transformers, connected to a utility grid providing electric energy to plural consumers. Conventionally, the power stream supplied to or exchanged with the utility grid needs to be controlled regarding electrical properties, such as power flow, voltage phase angle and so on. Due to the configuration of the conventional converter being composed of a generator portion, a DC-link and a utility grid portion, there are design options how to control the converter.

Conventionally, the converter may receive a power demand signal from a wind turbine controller. This power demand signal may conventionally be directly used in the utility grid converter portion which delivers the demanded power to the utility grid. Similarly, the generator converter portion may also receive the same power demand signal in a conventional system. To this power demand, a correction power, such as derived from a DC-link voltage controller may be added. The generator converter portion may then control the generator power to this combined value. Thus, conventionally, in the steady state, the utility grid converter power signal and the generator converter portion power signal are both equal to the demanded value (ignoring losses) and the DC-link voltage is at the demanded voltage value. Further conventional variants may control the torque of the generator rather than its power.

When conventionally the generator power is held constant also at varying generator rotational speed, this may not be optimal for damping mechanical resonances.

Thus, a technical problem solved by embodiments of the present invention may be regarded as providing a control method and a corresponding control arrangement which is capable of controlling a converter comprising a generator side portion and a utility grid portion such as to effectively damp mechanical oscillations, reduce speed ripples and/or the load to components of the generator and/or drive train and/or to improve efficiency and performance of power production.

SUMMARY

According to an embodiment of the present invention it is provided a method of controlling a converter, in particular of a wind turbine, the converter comprising a first (e.g. generator side) converter portion connected to a generator, a DC-link, and a second (e.g. utility grid side) converter portion connected to a utility grid, the method comprising: controlling the first converter portion and the second converter portion by a first control signal and a second control signal, respectively, both being derived based on a requested power signal, in particular requested active power signal, and a generator rotational speed, wherein the first control signal indicates substantially constant generator torque for rotational speed variations of the generator rotational speed above a frequency threshold.

The method may be performed by an arrangement for controlling a converter according to an embodiment of the present invention, in particular may be performed by a wind turbine controller.

The generator rotational speed may be measured or estimated, e.g. from generator currents and voltages as derived e.g. from a 'speed observer'. Thus, a physical measurement of speed is not required.

The first converter portion may also be referred to as a generator side converter portion and the second converter portion may also be referred to as a utility grid converter portion. Each converter portion may comprise plural controllable switches, such as IGBTs, wherein e.g. for each phase (for example in total three phases may be supported), two of the controllable switches may be connected in series (other converter topologies are possible). The conductance states of the controllable switches may be controlled by pulse width modulation signals. The first converter portion may in particular comprise or be a AC-DC converter portion being capable of converting a (variable) frequency AC power stream to a substantially DC power stream which may be present at the DC-link. The utility grid converter portion or the second converter portion may be capable of converting the DC power stream to a fixed frequency (for example 50 Hz or 60 Hz) power stream. The power stream or power output by the second converter portion may further be transformed by a transformer to a higher voltage before supplying the transformed power stream to a point of common coupling to which plural other wind turbines or other generators are connected.

The first control signal and the second control signal may for example define reference values such as active power, current, torque corresponding to desired values at the output terminal of the respective converter portion or of the generator. The respective first control signal and the second control signal may be supplied to controllers. The outputs of these controller might then be supplied to one or more gate driver circuits which generate from those control signals pulse width modulation signals which are sent to gates of the controllable switches in the first converter portion and the second converter portion, respectively. For example, space vector modulation schemes may be applied. The first control signal and the second control signal may be implemented as electrical signals and/or optical signals.

E.g. a (software) controller may receive the 1st and/or 2nd control signal and may output a demanded converter AC terminal voltage (either for the generator bridge or network bridge, respectively). The AC terminal voltage demand signal may be received at a PWM pattern generator which derives the switching pattern needed to achieve that terminal voltage, the switching pattern may be supplied to the gate drives.

The requested power signal may be or may correspond to a reference power desired to be output by the generator or the converter. The generator may in particular be implemented as a permanent magnet synchronous machine, for example three-phase permanent magnet electrical machine. The generator may comprise a stator providing a whole circumference and having one (e.g. three phase) winding set or may comprise two or more stator segments each segment providing a section of a whole circumference, such as 180°, 90°, 60° or the like, and each stator segment having one (e.g. three phase) winding set. Each of the potential plural winding sets may be connected to a respective associated first converter portion.

The requested power signal may for example be received from a wind park controller or an operator of a utility grid. The requested power signal may define a requested active power.

The first control signal may directly define a desired generator torque or may for example indicate a signal related to generator torque such as a current signal, in particular active current signal.

During operation of the generator, the generator rotational speed may vary. The variation of the generator rotational speed may for example comprise variations at different frequencies. The generator rotational speed varying over time may have different frequency components of variations. The different frequency components may for example be obtained by applying a Fourier transformation on the generator rotational speed as observed over time. Very fast variations of the generator rotational speed then correspond to high frequency components and low varying generator rotational speed corresponds to low frequency components. In the present application, high frequency components of the generator rotational speed variations may for example be referred to as those which have a frequency above the frequency threshold. Low frequency components of the generator rotational speed variations may be referred to as those frequency components of the rotational speed variations which are below the frequency threshold.

When there is (at least substantially) constant generator torque for rotational speed variations of the generator rotational speed above the frequency threshold, mechanical oscillations may effectively be damped. Further, efficiency may be improved and load may be decreased.

The first converter portion is connected to the generator. Controlling the first converter portion thus is capable of controlling the power and current as generated by the generator. When the generator torque is substantially constant, in particular varies less than 5% or less than 1% (for constant requested power signal), the load or wear of generator components or drive train components may be reduced. When the generator torque is substantially constant for the high frequency components of the rotational speed variations, the output power may vary according to the rotational speed variations.

The first converter portion may also be referred to as a generator bridge and the second converter portion may also be referred to as a network bridge in the context of the present application.

According to an embodiment of the present invention, the first control signal defines an active current demand value for the first converter portion, and/or the second control signal defines a power demand value or an active current demand value for the second converter portion, and/or wherein the frequency threshold is in a range of between 0.01 Hz and 1 Hz, in particular between 0.1 Hz and 1 Hz.

When the first control signal defines an active current demand value for the first converter portion, conventionally applied control schemes may be utilized upon modification for implementation of the control method. Further, when the second control signal defines a power demand value or an active current demand value, also the conventionally known algorithms may be employed and modified for implementation of the control method.

The generator rotational speed may correspond to the mechanical rotational speed of the rotor rotating within the generator. In other embodiments, the generator rotational speed may correspond to the electrical rotational speed being proportional to the rotational speed of the rotor. Thereby, starting from conventionally known control schemes, this embodiment of the invention may be implemented.

According to an embodiment of the present invention, the first control signal indicates varying generator torque for rotational speed variations below the frequency threshold, in particular indicating generator torque varying in accordance to the rotational speed variations.

When the generator torque varies for the low frequency components of the generator rotational speed, excitations of mechanical vibration may be less than at the high frequency components. Furthermore, by varying the generator torque, the output power may substantially be constant for rotational speed variations below the frequency threshold, to more closely meet the requested power signal.

According to an embodiment of the present invention, the second control signal and/or power demand value for the second converter portion varies for rotational speed variations above the frequency threshold, in particular the second control signal and/or power demand value varies for rotational speed variations above the frequency threshold in accordance with the rotational speed variations.

The first control signal may be more or less constant as rotational speed varies, whereas the second control signal may vary as rotational speed varies.

In particular, both generator portions may be controlled with compatible control signals such that the converter portions do not counteract each other.

According to an embodiment of the present invention, the second control signal and/or power demand value for the second converter portion is substantially constant for rotational speed variations below the frequency threshold.

All low frequencies the second control signal and/or power demand value for the second converter portion may substantially be a constant depending on the requested power signal.

According to an embodiment of the present invention, the DC-link is controlled for constant DC-voltage by a DC-link controller. The DC-link controller may thereby control the input voltage, i.e. the DC-voltage, for the second converter portion. Thus, it may be ensured that the output voltage of the second converter portion is within desired ranges.

According to an embodiment of the present invention, the DC-link controller generates a power modification signal in response to a DC-voltage error. The DC-link controller may for example comprise a PI or PID controller which receives the DC-voltage error (the difference between a measured DC-voltage and a reference DC-voltage) and derives the power modification signal in dependence of the DC-voltage error such that the DC-voltage error decreases more and more, ideally reaching zero.

According to an embodiment of the present invention, the method further comprises determining the second control signal, including: receiving the requested power value; low pass filtering the generator rotational speed; dividing the generator rotational speed by the filtered generator rotational speed to obtain a division signal; and multiplying the requested power signal with a signal derived based on the division signal to obtain the second control signal.

Low pass filtering the generator rotational speed may utilize a low pass filter having an appropriately set frequency threshold. The filtered generator rotational speed may not or may only have reduced amplitudes of the high frequency components of the rotational speed variations. The division signal may be larger than zero for the high frequency components and may be equal to one for the low frequency components of the rotational speed variations. Thus, the second control signal may cyclically change between being larger and smaller than the requested power for the high frequency components and may be equal to the requested power for the low frequency components of the rotational speed variations.

The second control signal may be varying as the speed varies, at higher frequencies, tending to vary around the value of 1.

Thus, the utility grid power demand (a particular implementation of the second control signal) may vary with the generator rotational speed in the high frequency regime. Thereby, however, the generator torque may be held substantially constant.

According to an embodiment of the present invention, the signal derived based on the division signal is obtained by one of: the division signal; by applying a compensation filter, in particular compensating for phase error and/or gain error of the observed (estimated) rotational speed signal and/or a utility bridge power transfer function, to the division signal.

The compensation filter may be provided mainly to compensate for the speed observer gain/phase errors and network bridge power transfer function only.

The compensation filter may also be referred to as lead/lag filter which may receive as input low pass filtered utility grid active power, low pass filtered utility grid reactive power and low pass filtered generator rotational speed. The input values may define a respective operational point. Thereby, rotational speed estimation gain/phase errors and utility grid (network bridge) power transfer function gain/phase errors may be dealt with and may be considered.

According to an embodiment of the present invention, the compensation filter is tuned in dependence of a respective operation point of the first converter portion and/or the second converter portion and/or the generator and/or utility grid. Thereby, the method may further be improved and measurement related errors or phase shifts may be decreased.

According to an embodiment of the present invention, the method further comprises determining the first control signal, including: receiving the requested power signal; adding the requested power value to the power modification signal (output by the DC controller) to obtain a generator power demand signal; low pass filtering the generator rotational speed; multiplying the filtered generator rotational speed with a (stator) flux signal associated with magnetic flux of the generator to obtain a generator back EMF signal; dividing the generator power demand value by the generator back EMF signal to obtain the first control signal.

Thereby, the first control signal may be obtained in a simple manner. The flux signal may correspond to a magnetic flux of the generator which may be due to the permanent magnets and may be due to magnetic fields as generated by the windings of the stator of the generator. The flux may for example be measured or determined, such as calculated from other known or measured quantities, such as current, voltage, inductivity or the like.

An estimate of the actual generator flux can be derived from measurements of voltage and current, and some knowledge of the generator parameters, for example inductance and resistance.

According to an embodiment of the present invention, the first control signal and/or the second control signal indicates varying power for rotational speed variations above the frequency threshold, in particular indicate varying power in accordance to the rotational speed variations above the frequency threshold; and/or wherein the second control signal indicates substantially constant torque for rotational speed variations above the frequency threshold.

Since the power varies at relatively high frequencies, deviations from the requested power may also have a relatively high frequency thus not substantially disturbing the power output.

It should be understood, that features, individually or in any combination, disclosed, described, applied or explained in the context of a method of controlling a converter may also be applied, individually or in any combination to an arrangement for controlling a converter according to an embodiment of the present invention and vice versa.

According to an embodiment of the present invention it is provided an arrangement for controlling a converter, in particular of a wind turbine, the converter comprising a first (e.g. generator side) converter portion connected to a generator, a DC-link, and a second (e.g. utility grid side) converter portion connected to a utility grid, the arrangement comprising: an input section for receiving input signals including a requested power signal, in particular requested active power signal, and a (estimated or observed or measured) generator rotational speed, a control section adapted to control the first converter portion and the second converter portion by a first control signal and a second control signal, respectively, both being derived based on the input signals, wherein the first control signal indicates substantially constant generator torque for rotational speed variations of the generator above a frequency threshold.

Furthermore, according to an embodiment it is provided a generator system, comprising: a generator; a converter, comprising a first converter portion connected to the generator, a DC-link, and a second converter portion connectable to a utility grid; and an arrangement according to the preceding embodiment connected to control the converter.

Furthermore, according to an embodiment of the present invention it is provided a wind turbine comprising: a rotor shaft at which plural blades are mounted and a generator system according to the preceding embodiment.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

The illustration in the drawings is in schematic form. It is noted that in different figures, similar or identical elements are provided with the same reference signs or with reference signs, which are different from the corresponding reference signs only within the first digit.

Figure 1:
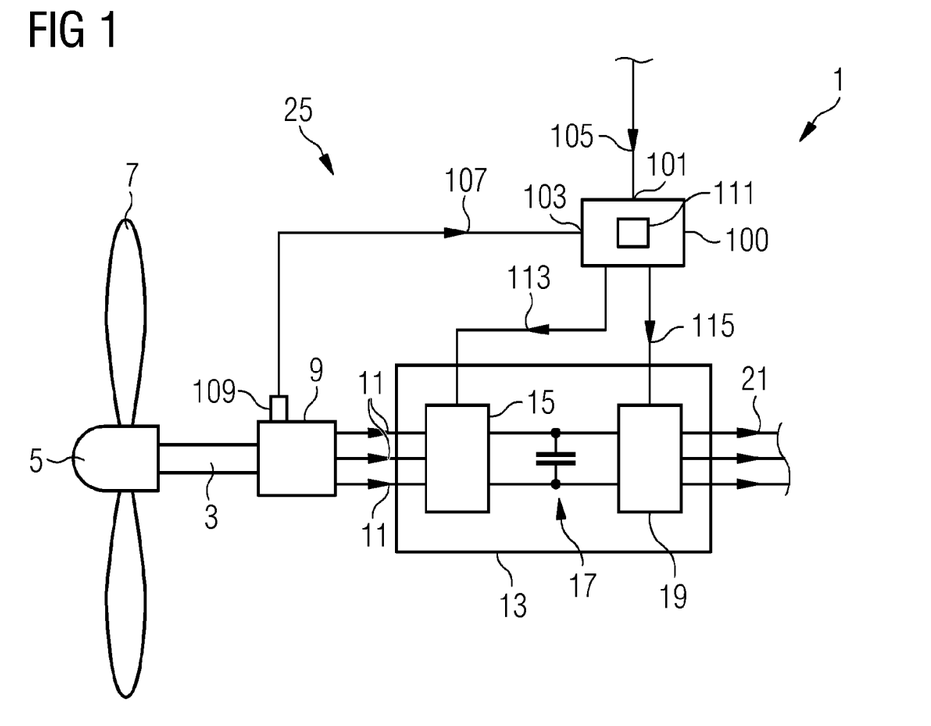
FIG. 1 schematically illustrates a wind turbine according to an embodiment of the present invention comprising an arrangement according to an embodiment of the present invention.

The wind turbine 1 schematically illustrated in FIG. 1 comprises a rotation shaft 3 having a hub 5 at which plural rotor blades 7 are mounted. The rotor shaft 3 rotates within the generator 9 which outputs a three-phase (or different number of phases) power stream 11. The generator 9 may be a single channel or dual or multi channel generator, each channel may have an associated converter. The output terminals of the generator 9 are connected to a converter 13 which comprises a (first) generator side portion 15, a DC-link 17 and a (second) utility grid portion 19. The utility grid converter portion 19 outputs a three-phase power signal 21 which may for example be supplied via a transformer to a point of common coupling which in turn is connected to a utility grid.

The converter 13 is controlled by an arrangement 100 for controlling a converter according to an embodiment of the present invention. Further, the generator 9, the converter 13 and the arrangement 100 form a generator system according to an embodiment of the present invention, the generator system being labelled with reference sign 25.

The arrangement 100 comprises an input section formed by input terminals 101, 103 for receiving input signals including a requested power signal 105 and a generator rotational speed 107 which is measured by a measurement sensor 109. In other embodiment, the measurement sensor 109 is realized by means of an observer, which derives the rotational speed indirectly via measured electric quantities. The requested power signal 105 may for example be supplied from a wind park controller. Based on the input signals 105, 107, the arrangement 100 derives, using a control section 111, and outputs a first control signal 113 to the first portion 15 of the converter 13 and derives and outputs a second control signal 115 to the second converter portion 19 of the converter 13. The control signals 113, 115 may define reference values, such as regarding active power, reactive power, current, torque which are then used by controllers whose outputs are pulse modulation signals for plural controllable switches within the first converter portion 15 and the second converter portion 19. Thereby, the first control signal 113 indicates substantially constant generator torque for rotational speed variations of the generator 9 above a frequency threshold.

The arrangement 100 illustrated in a schematic manner in FIG. 1 is capable of carrying out or performing a method of controlling a converter according to an embodiment of the present invention.

Figure 2:
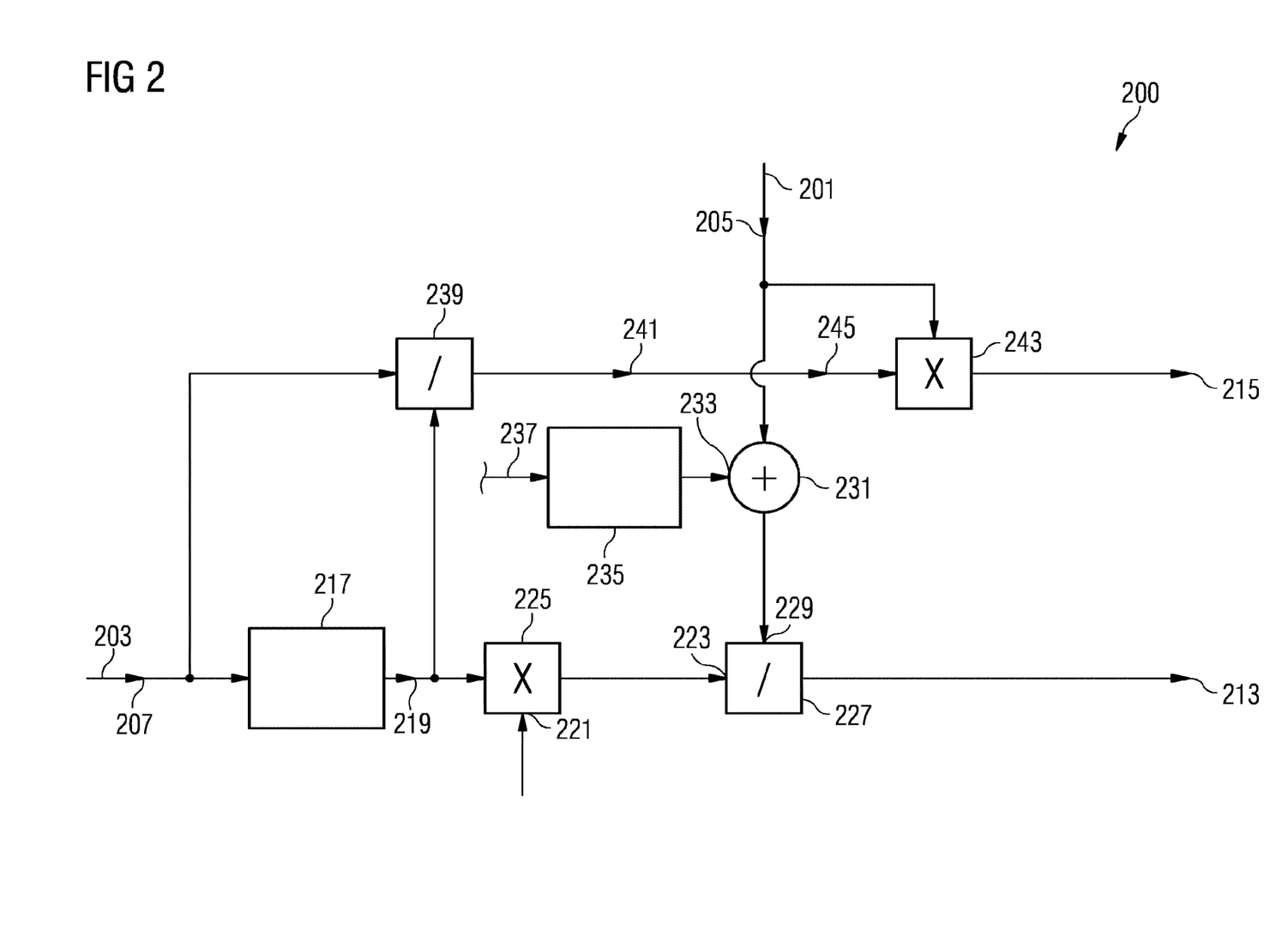
FIG. 2 schematically illustrates an arrangement for controlling a converter according to an embodiment of the present invention.

FIG. 2 schematically illustrates an arrangement 200 of controlling a converter according to an embodiment of the present invention which may for example be utilized as the arrangement 100 illustrated in FIG. 1.

Figure 3:
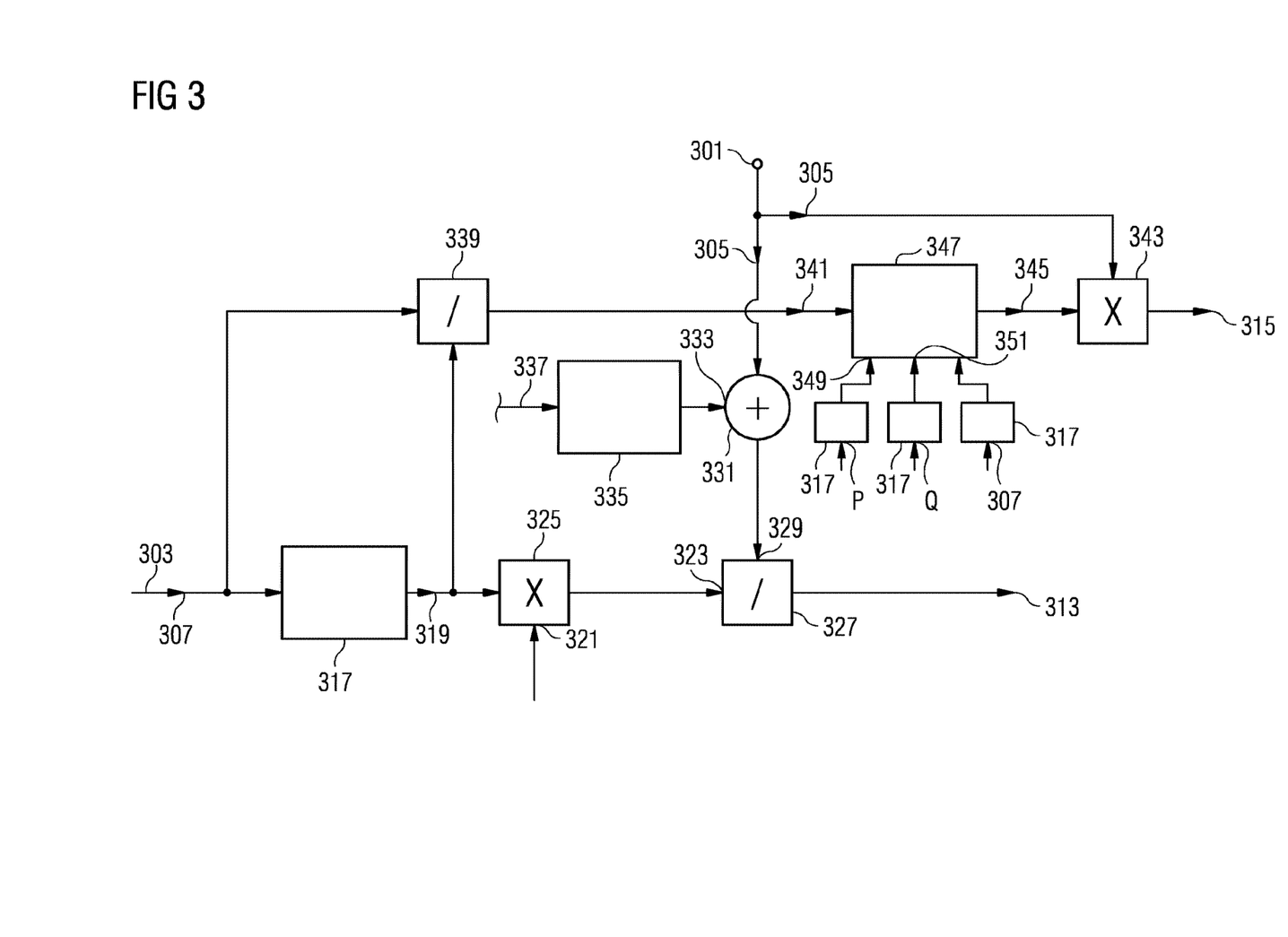
FIG. 3 schematically illustrates an arrangement for controlling a converter according to another embodiment of the present invention.

It is noted, that elements similar in structure and/or function in the FIGS. 1 to 3 are labelled with reference signs differing only in the first digit. A description of a particular element not described with reference to a particular drawing may be taken from the description in another drawing or another embodiment.

The generator rotational speed 107 is received at the input terminal 203, the requested power signal 105 is received at an input terminal 201. Using a low pass filter 217 the generator rotational speed 207 is filtered to remove high frequency components and results in a filtered generator rotational speed signal 219.

The filtered generator rotational speed 219 is multiplied by a flux signal 221 which is associated with the magnetic flux of the generator 9, in order to obtain a generator back EMF signal 223. Thereby, the multiplication is performed using a multiplication element 225.

Using a division element 227, a generator power demand value 229 is divided by the generator back EMF signal 223 to obtain the first control signal 213, here in particular the generator active current demand value or signal.

Furthermore, the requested power signal 205 is received and added, using an addition element 231 to a power modification signal 233 to result in the generator power demand signal 229. The power modification signal 233 is generated using a DC-link controller 235 which receives a DC-voltage error signal 237.

For generating the second control signal 215, the generator rotational speed 207 is divided, using a division element 239 by the filtered generator rotational speed 219 to obtain a division signal 241. The requested power signal 205 is multiplied, using a multiplication element 243, with a signal 245 which is derived based on the division signal 241, to obtain the second control signal 215. In the embodiment illustrated in FIG. 2, the signal 245 which is derived based on the division signal is equal to the division signal 241.

However, in an alternative embodiment, as is illustrated in FIG. 3, the signal 345 which is derived based on the division signal 341 is generated by applying a compensation filter 347 to the division signal 341. Thereby, the compensation filter 347 is tuned in dependence of input signals such as relating to the operation point of the first converter portion 15, the second converter portion 19. In the illustrated embodiment, the compensation filter 247 receives a low pass filtered grid power 349, a low pass filtered grid reactive power 351 and a low pass filtered observed speed 319.

According to an embodiment of the present invention, the DC-link controller output signal affects the first converter portion, i.e. the generator side converter portion. The generator torque may be held relatively constant in the presence of rotational speed variations. According to an embodiment of the present invention, the DC-link controller 235 location is at the generator bridge. The external demand signal 205 may comprise a power demand signal. The utility converter portion 19 may be controlled by the controller which acts in a way in which the torque is held substantially constant, wherein the power may deliberately deviate from the demand in response to speed fluctuations. The generator side converter portion 15 may be controlled to attempt to hold constant the torque as well. As the generator speed varies, generator power may vary (for frequencies above the frequency threshold) in phase with the speed (i.e. torque tends to be held relatively constant) which may tend to damp mechanical resonances.

As can be taken from FIGS. 2 and 3, in order to calculate the generator active current demand (for example first control signal 213, 313 illustrated in FIGS. 2 and 3), the generator power demand signal 229 is divided by the generator back EMF signal 223, 323. By including a filter 217, 317 into a rotational speed signal 207 which is used to calculate the generator back EMF 223, this tends to reject speed fluctuations from the generator active current demand, i.e. may tend to hold generator active current relatively constant in the presence of the speed fluctuations. Since the generator active current may be closely related to the generator torque, this may introduce a property of tending to hold generator torque relatively constant in the presence of speed fluctuations.

According to an embodiment of the present invention, at frequencies above the cut-off frequency (e.g. frequency threshold) of the low pass filter 217, 317, a constant-torque-like characteristic is created and at frequencies below the cut-off frequency (e.g. frequency threshold) of the low pass filter 217, 317), constant power characteristic may be created.

If this generator side converter portion feature was the only modification, then the network and generator bridges would have mismatched control objectives. The network bridge would want to hold power constant in the presence of speed fluctuations, whereas the generator bridge would want the power to vary in response to speed fluctuations. The resultant mismatched power in the two different converter portions (or bridges) would result in a DC-link voltage error and from this voltage error the DC-link controller would modify the generator power demand. In so doing, this additional power demand would act to counter the constant-torque-like characteristic that was introduced in the generator converter portion.

In order to avoid this issue, the network bridge power demand is modified in response to speed fluctuations, as shown in FIGS. 2 and 3. In an alternative implementation (with similar or identical behaviour), the downstream net active current demand may be modified rather than the net power demand. By closely matching the way in both network and generator bridges, modifying power (compared with the externally requested value) in the presence of speed fluctuations, this tends to prevent the DC-link from observing voltage errors at the frequencies at which speed is fluctuating, and therefore tends to prevent the DC-link controller from creating an unwanted modification to the generator power demand at the frequencies at which speed is fluctuating.

Thereby, according to embodiments of the present invention, a close to desired constant torque characteristic may be achieved overall, for speed disturbances at frequencies above the cut-off frequency of the low pass filter 217, 317. At all frequencies of speed disturbance, the power in both the network bridge and the generator bridge may be very similar, leading to inherently good control of the DC-link voltage.

In the alternative embodiment 300 illustrated in FIG. 3, the additional filter 347 is introduced in the calculation path of the power demand to the network bridge, to potentially further enhance the performance. This filter 347 may be adaptively tuned as a function of the network bridge and/or generator bridge operating point and may compensate for gain and/or phase introduced in the observed speed and/or the network bridge power transfer function.

According to an embodiment of the present invention, the network bridge power demand is modified to create a (substantially) constant-torque-like characteristic, as generator speed fluctuates (in particular having frequency components for high frequencies). Further, the generator bridge current demand may be modified according to an embodiment of the present invention, to create a constant-torque-like characteristic, as generator speed fluctuates. The DC-link controller may be associated with the generator bridge.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a converter of a wind turbine, the converter comprising a first converter portion connected to a generator, a DC-link, and a second converter portion connected to a utility grid, the method comprising:
controlling the first converter portion with a first control signal that is output to the first converter portion, and controlling the second converter portion with a second control signal that is output to the second converter portion, the first control signal and the second control signal both being derived based on a requested power signal and a generator rotational speed; and
determining the second control signal by:
receiving the requested power value;
low pass filtering the generator rotational speed;
dividing the generator rotational speed by the filtered generator rotational speed to obtain a division signal; and
multiplying the requested power signal with a signal derived based on the division signal to obtain the second control signal;
wherein the first control signal indicates substantially constant generator torque for rotational speed variations of the generator rotational speed above a frequency threshold.

2. The method according to claim 1,
wherein the first control signal defines an active current demand value for the first converter portion, and/or
wherein the second control signal defines a power demand value or an active current demand value for the second converter portion, and/or
wherein the frequency threshold is in a range of between 0.01 Hz and 1 Hz.

3. The method according to claim 1, wherein the first control signal indicates varying generator torque for rotational speed variations below the frequency threshold.

4. The method according to claim 1, wherein the second control signal and/or power demand value for the second converter portion varies for rotational speed variations above the frequency threshold.

5. The method according to claim 1, wherein the second control signal and/or power demand value for the second converter portion is substantially constant for rotational speed variations below the frequency threshold.

6. The method according to claim 1, wherein the DC-link is controlled for constant DC-voltage by a DC-link controller.

7. The method according to claim 6, wherein the DC-link controller generates a power modification signal in response to a DC-voltage error.

8. The method according to claim 1, wherein the signal derived based on the division signal is obtained by one of:
the division signal; and
by applying a compensation filter compensating for rotational speed estimation phase error and/or gain error and/or utility grid power transfer function gain and/or phase error, to the division signal.

9. The method according to claim 8, wherein the compensation filter is tuned in dependence of a respective operation point of the first converter portion and/or the second converter portion and/or the generator and/or utility grid.

10. The method according to claim 9, further comprising determining the first control signal by:
receiving the requested power signal;
adding the requested power value to the power modification signal to obtain a generator power demand signal;
low pass filtering the generator rotational speed;
multiplying the filtered generator rotational speed with a flux signal associated with magnetic flux of the generator to obtain a generator back EMF signal;
dividing the generator power demand value by the generator back EMF signal to obtain the first control signal.

11. The method according to claim 1,
wherein the first control signal and/or the second control signal indicates varying power for rotational speed variations above the frequency threshold; and/or
wherein the second control signal indicates substantially constant torque for rotational speed variations above the frequency threshold.

12. An arrangement for controlling a converter of a wind turbine, the converter comprising a first converter portion connectable to a generator, a DC-link, and a second converter portion connectable to a utility grid, the arrangement comprising:
an input section for receiving input signals including a requested power signal, and a measured or estimated generator rotational speed; and
a control section adapted to control the first converter portion with a first control signal that is output to the first converter portion and the second converter portion with a second control signal that is output to the second converter portion, the first control signal and the second control signal both being derived based on the input signals;
wherein the second control signal is determined by:
receiving the requested power value;
low pass filtering the generator rotational speed;
dividing the generator rotational speed by the filtered generator rotational speed to obtain a division signal; and
multiplying the requested power signal with a signal derived based on the division signal to obtain the second control signal;
wherein the first control signal indicates substantially constant generator torque for rotational speed variations of the generator above a frequency threshold.

13. A generator system, comprising:
a generator;
a converter, comprising a first converter portion connected to the generator, a DC-link, and a second converter portion connectable to a utility grid; and
the arrangement according to claim 12 connected to control the converter.

14. A wind turbine, comprising:
a rotor shaft at which plural blades are mounted; and
the generator system according to claim 13.

* * * * *